United States Patent [19]

Watanabe et al.

[11] 4,071,860
[45] Jan. 31, 1978

[54] CASSETTE TAPE RECORDER

[75] Inventors: Kaoru Watanabe; Syogo Nakayama, both of Yokohama, Japan

[73] Assignee: Matsushita Electrical Industrial Co., Ltd., Osaka, Japan

[21] Appl. No.: 667,561

[22] Filed: Mar. 17, 1976

[30] Foreign Application Priority Data

| Mar. 20, 1975 | Japan | 50-34131 |
| Mar. 20, 1975 | Japan | 50-38169[U] |
| Nov. 6, 1975 | Japan | 50-133816 |
| Nov. 20, 1975 | Japan | 50-139893 |

[51] Int. Cl.² ............... G11B 23/04; G11B 15/10; G11B 19/26
[52] U.S. Cl. ............................................. 360/96
[58] Field of Search ............... 360/96, 93, 94, 71, 360/73-74; 242/198-201

[56] References Cited

U.S. PATENT DOCUMENTS

| 3,747,941 | 7/1973 | Van Der Lely | 360/96 |
| 3,764,089 | 10/1973 | Yoshida | 360/96 |
| 3,820,158 | 6/1924 | Schober | 360/96 |
| 3,849,799 | 11/1974 | Nakamichi | 360/96 |
| 3,867,722 | 2/1975 | Syohji | 360/96 |
| 3,902,193 | 8/1975 | Hapke | 360/96 |

Primary Examiner—Alfred H. Eddleman
Attorney, Agent, or Firm—Burgess, Ryan and Wayne

[57] ABSTRACT

A cassette tape recorder whose major parts comprise of two arms arranged in the form of an X letter, two cassette holders vertically movable relative to side plates, two plate cams, and a chassis plate having a head mounted on one side thereof and a knob attached to or formed integral with the other side thereof, whereby the cassette eject, fast-forward or rewinding mode may be selected by operating the same knob.

8 Claims, 19 Drawing Figures

CASSETTE TAPE RECORDER

BACKGROUND OF THE PRESENT INVENTION

The present invention relates to a cassette tape recorder in which the setting and ejection of a tape cassette may be facilitated, and the eject, fast-forward or rewinding mode may be selected by one lever.

As disclosed for instance in U.S. Pat. No. 3,146,316 there has been devised and demonstrated a cassette tape recorder of the type in which when a tape cassette is placed into a loading mechanism, it pushes the free ends of two crossed arms to cause the rotation thereof so that when the arms are rotated through a predetermined angle, the cassette tape is placed in the operative position with the tape being pressed against the capstans and holes of the reels in engagement with the spindles. The tape recorder of this type has an advantage that even when the cassette is placed into the loading mechanism in slight misalignment with the correct cassette placing direction, the insertion of the cassette into the loading mechanism may be detected without fail. That is, when the cassette makes contact with either of the two arms, it so controls cassette guide means that the cassette may be placed in exact position in the loading mechanism. However, due to the above operative arrangement of the loading mechanism, there is a distinct defect in that the thickness of the cassette guide means cannot be made substantially equal to that of the cassette and consequently it is impossible to make the thickness or height of the cassete tape recorder shorter beyond a certain limit.

Furthermore, in the conventional cassette tape recorders, a magnet is attached to a spindle while a reed switch is mounted on a chassis plate in the proximity of the spindle so that the end of the tape may be detected. However, the inspection and replacement of the reed switch mounted on the chassis plate are not easy, and there is a danger that other parts are damaged when the broken reed switch is detached from the chassis plate and a new reed switched is mounted.

The conventional cassette tape recorders have a further common defect that when the switching from the fast-forward mode to the rewinding mode or vice versa is made too rapidly, there is a possibility that the tape is broken.

SUMMARY OF THE INVENTION

In view of the above, one of the objects of the present invention is to provide a cassette tape recorder which is very compact in size especially with an extremely thinner thickness yet very easy to operate.

Another object of the present invention is to provide a cassette tape recorder whose inspection maintenance and repair may be much facilitated.

A further object of the present invention is to provide a cassette tape recorder in which the placement and ejection of a tape cassette may be much facilitated, and the eject, fast-forward or rewinding mode may be selected only by one lever.

A further object of the present invention is to provide a cassette tape recorder which may be easily detected to be in the operative or inoperative position.

A further object of the present invention is to provide a cassette tape recorder in which the operating knob or lever is completely retracted into the tape recorder in the operative position so that the tape recorder will not present any obstacle.

A further object of the present invention is to provide a cassette tape recorder in which the switching from the fast-forward mode to the rewinding or vice versa is permitted only after the tape recorder is put into the operative or playing mode so that the damage to the tape in the cassette may be prevented.

A further object of the present invention is to provide a cassette tape recorder which may permit the easy inspection, maintenance and replacement of a reed switch which is incorporated in order to detect the end of the tape transported in one direction.

To the above and other ends, the present invention provides a cassette tape recorder characterized by the provision of two cassette holders which are vertically movable relative to side plates of the cassette tape recorder and which are located independently of each other, two arms each having its free end terminated into a cassette detecting projection and the base pivoted to the side plate, said two arms being so arranged in the form of an X letter, springs for normally so biasing said arms that an inserted cassette may be normally pushed away, two plate cams which are so arranged as to rotate in contact with one of the surfaces of said side plates and whose rotation is prevented by said arms in the nonoperative mode, and which prevent the rotation of said arms in the operative mode, means which follows the movement of said plate cams so as to vertically move said cassette holders, a chassis plate which is movable over a bottom plate formed integral with said side plates and which has a head mounted thereupon one side thereof and a knob formed at or attached to the other side thereof and which follows the motion of said cams, and springs for normally pulling said chassis plate toward said knob, whereby a tape cassette inserted into cassette guide means causes the rotation of said arms to release and rotate said plate cams, thereby moving the cassette guide means downwardly while advancing said chassis plate forwardly into the operative position, and the displacement of said chassis plate in the reverse direction causes said plate cams to move said cassette holders upwardly while releasing said arms, thereby exerting the ejecting forces to the tape cassette inserted into the cassette holders.

Figure 1:
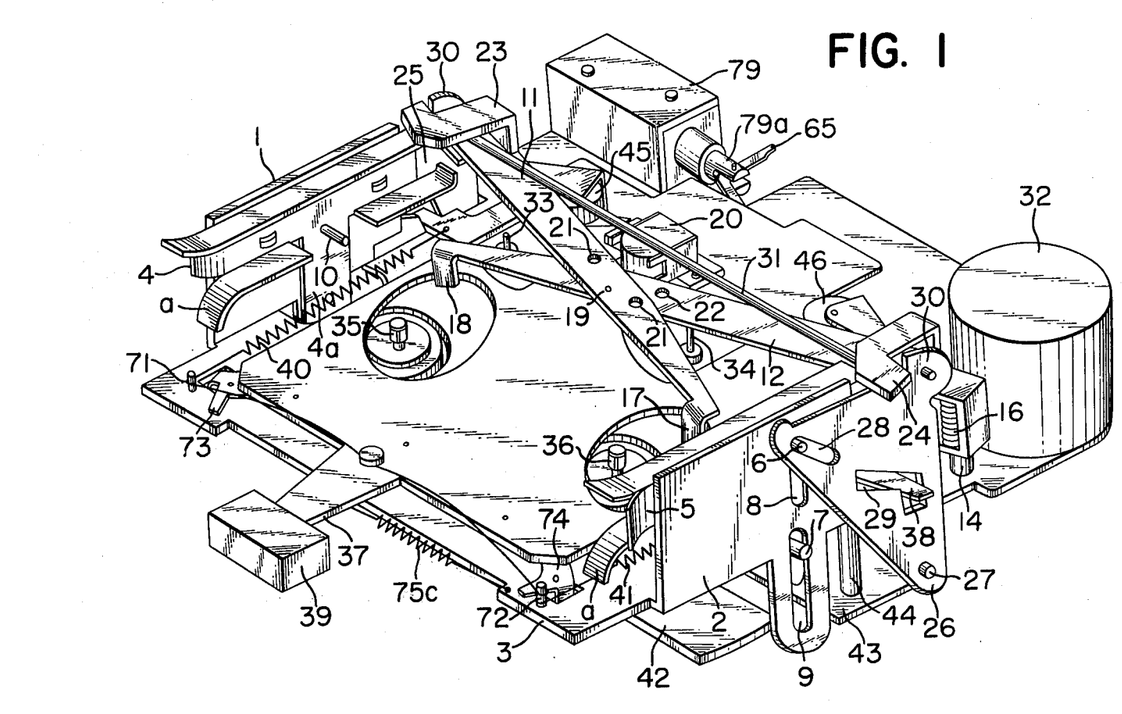
FIG. 1 is a perspective view of a cassette tape recorder in accordance with the present invention.
Figure 2:
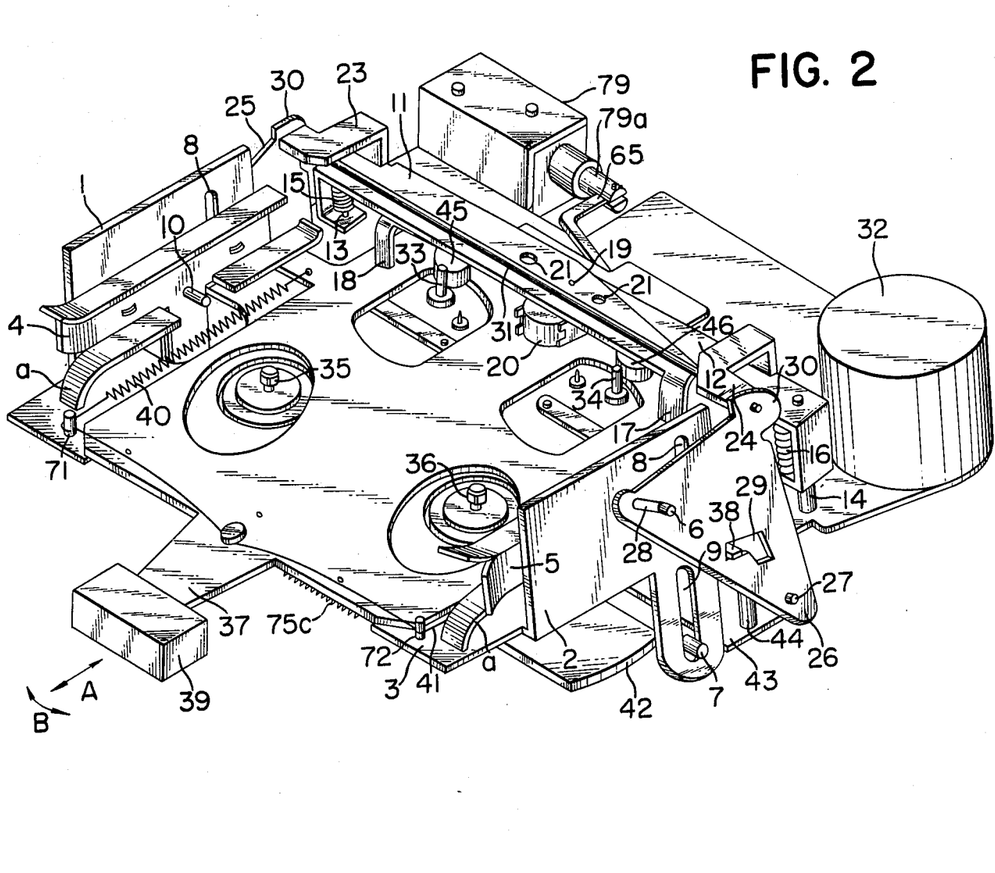
FIG. 2 is a view similar to FIG. 1, but shows the tape recorder in the operative position or play mode.

DESCRIPTION OF THE PREFERRED EMBODIMENT:

In FIG. 1 there is shown a tape recorder in the inoperative position while FIG. 2 shows the tape recorder in the operative position. A tape cassette is not shown.

Figure 3:
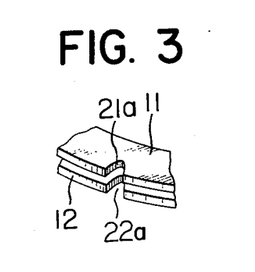
FIGS. 3 and 4 are perspective views, on enlarged size, of parts thereof.
Figure 4:
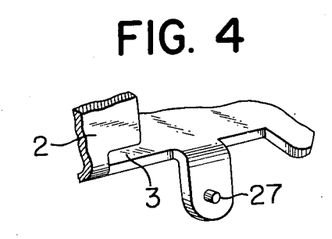

A tape cassette (not shown) is inserted into cassette holders 4 and 5 from the front sides a thereof. The cassette holders 4 and 5 are vertically movable relative to side plates 1 and 2 of a U-shaped chassis having a bottom plate 3. The front end portions *a* are slightly outwardly extended in order to facilitate the insertion of a tape cassette into the cassette holders 4 and 5. Each of the cassette holders 4 and 5 has two pins 6 and 7 slidably fitted into elongated slots 8 and 9, respectively, formed in the side plates 1 and 2 so that the movement of the cassette holders 4 and 5 may be controlled. 10 is a pin for guiding a tape cassette. The pin 10 is provided each of cassette holders 4 and 5 because a member 4*a* which is provided for providing the pin 7 for the cassette holders 4 and 5 prevents the smooth insertion of the tape cassette into the holders 4 and 5. 11 and 12 are arms pivoted with pins 13 and 14 to the bottom plate 3, and the free ends of the arms 11 and 12 terminate into cassette detecting projections 17 and 18. A pin 19 extended from the arm 11 is fitted into an elongated slot (not shown) formed in the second arm 12 so that the first and second arms 11 and 12 may be rotated in unison, and springs 15 and 16 are fitted over the pivot pins 13 and 14 so that the cassette detecting projections 17 and 18 may be normally biased toward a knob 39 to be described hereinafter. 21 and 22 are holes through which is inserted an adjusting tool or screw driver for adjusting the angle of a magnetic head 20 when the head is mounted. Alternatively, as shown in FIG. 3, notches 21*a* and 22*a* may be provided, 23 and 24 are stoppers formed at the bases of the arms 11 and 12. 25 and 26 are plate cams pivoted with pins 27 to the bottom plate 3 as shown in FIG. 4 in such a way that both cam plates 25 and 26 may rotated in contact with the outer surface of the side plates 1 and 2, respectively. Each cam has an elongated slot 28, an L-shaped guide slot 29 and a cam portion 30. 31 is a connecting rod for attaining the synchronization between the movement of the cams 25 and 26. 32 is a motor for driving capstans 33 and 34 and reel spindles 35 and 36. 37 is a chassis plate provided with projections 38 extended from both sides thereof for engagement with the guide slots 29 of the cams 25 and 26, a knob 39 extended from the front side and the magnetic head 20 mounted on the rear side. The chassis plate 37 lies over the bottom plate 3. The chassis plate 37 may be displaced in the directions indicated by the double-pointed arrow A in FIG. 2, and may be also rotated in the directions indicated by the double-pointed arrow B in FIG. 2 only when the chassis plate 37 is in the position shown in FIG. 2. 40 and 41 are springs having one end fastened to the chassis plate 37 and having the other end fastened to the bottom plate 3 so that the chassis plate 37 may be normally biased forwardly. 42 is a mount plate upon which are mounted the reel spindles 35 and 36 which extended through the bottom plate 3 and the chassis plate 37. 43 is a plate upon which are mounted flywheels operatively coupled to the capstans 33 and 34.

Next the mode of operation will be described.

1. A tape cassette is inserted into the tape recorder:

The stoppers 23 and 24 of the arms 11 and 12 engage with the cam portions 30 of the plate cams 25 and 26 as shown in FIG. 1 so that the cassette detecting projections 17 and 18 of the arms 11 and 12 are located in a predetermined position.

The chassis plate 37 is normally biased forwardly under the forces of the springs 40 and 41, but are locked in position by the plate cams 25 and 26 because the projections 38 engage with the L-shaped guide slots 29. When the cassette is inserted from the front ends *a* of the cassette holders 4 and 5, it strikes against the cassette detecting projections 17 and 18 of the arms 11 and 12 so that the latter are caused to rotate about the pivot pins 13 and 14.

As a result, the stoppers 23 and 24 of the arms 11 and 12 are released from the cam portions 30 of the plate cams 25 and 26 so that the arms 11 and 12 are released from the locked state when the cassette is inserted to a predetermined depth.

The plate cams 25 and 26 are rotated about the pins 27 under the tension of the springs 40 and 41 while the chassis plate 37 is displaced forwardly. Then, the projections 38 of the plate cams 25 and 26 engage with the L-shaped guide slots 29 as shown in FIG. 2. The displacement of both the plate cams 25 and 26 and the chassis plate 37 is limited by the engagement between the projections 38 and the guide slots 29.

In this case, the stoppers 23 and 24 of the arms 11 and 12 are brought into contact with the inner surfaces of the cam portions 30 of the plate cams 25 and 26 as shown in FIG. 2 so that the rotation of the arms 11 and 12 is locked. As the chassis plate 37 is displaced as shown in FIG. 2, the pins 6 cause the cassette holders 4 and 5 to be displaced as shown in FIG. 2 so that the cassette is positioned relative to the capstans 33 and 34, the magnetic head 20 and the reel spindles 35 and 36. The function of pinch rollers will be described hereinafter. The tape recorder is now in the operative position.

2. Ejection of cassette

One pushes the knob 39 toward the reel spindles 35 and 36 against the springs 40 and 41, the chassis plate 37 is horizontally displaced over the bottom plate 3 so that the projections 38 of the chassis plate 37 are horizontally displaced within the guide slots 29. When one further pushes the knob 39, the projections 38 strike against the wall surfaces of the L-shaped guide slots 29, causing the plate cams 25 and 26 to rotate. Therefore, the plate cams 25 and 26 start to rotate, and upon rotation of the plate cams 25 and 26 the pins 6 causes the cassette holders 4 and 5 to lift. Upon rotation through an angle, the arms 11 and 12 are released and are returned to the initial position shown in FIG. 1 under the forces of the springs 15 and 16 so that the cassette detecting projections 17 and 18 strike the cassette, thereby ejecting the cassette out of the cassette holders 4 and 5. That is, in the inoperative position shown in FIG. 1, the arms 11 and 12, the cassette holders 4 and 5, the plate cams 25 and 26 and the chassis plate 37 are locked in position by the engagement between the stoppers 23 and 24 of the arms 11 and 12 and the cam portions 30 of the plate cams 25 and 26. In the operative mode shown in FIG. 2, the plate cams 25 and 26, the chassis plate 37 and the arms 11 and 12 are locked in position. In the operative position shown in FIG. 2, the driving force is transmitted through an idler to the reel spindle 35 or 36 from a flywheel corresponding to the capstan 33 or 34.

Figure 5A:
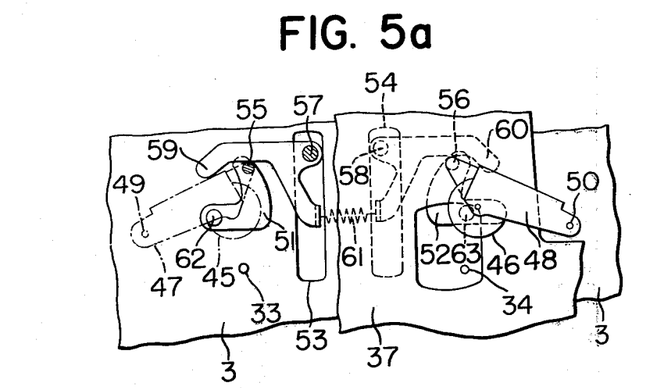
FIGS 5(a) through (f) are views used for the explanation of the mode of operation of pinch rollers and their associated parts.
Figure 5B:
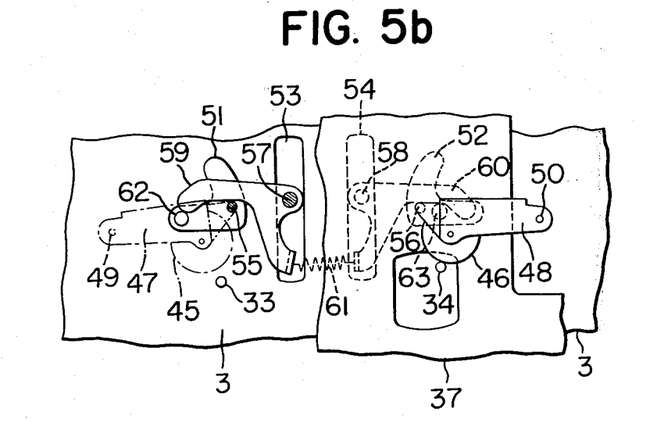
Figure 5C:
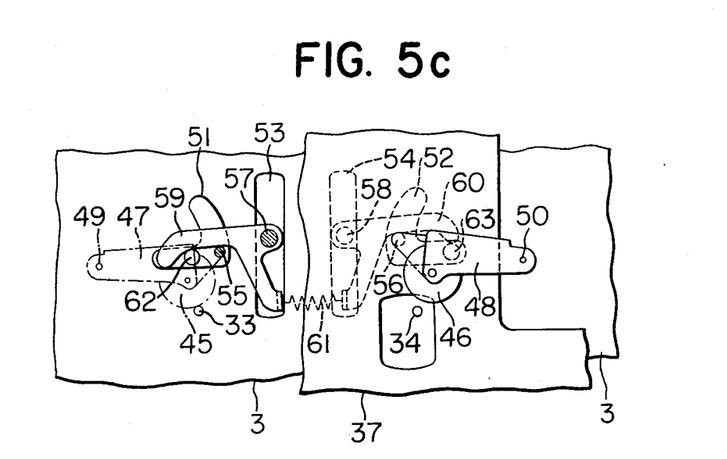
Figure 5D:
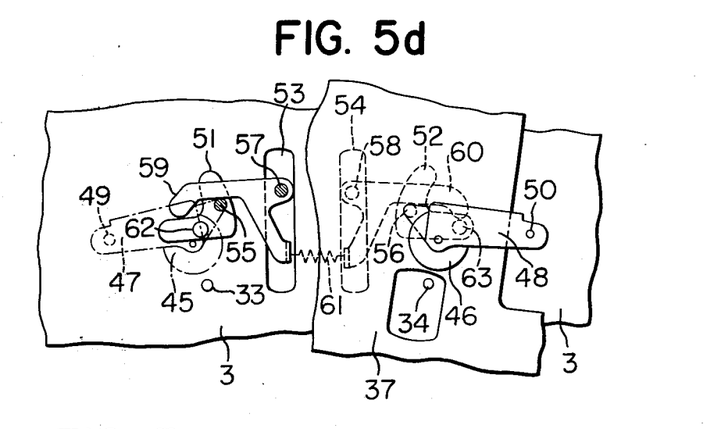

Next the pinch rollers 45 and 46 and a solenoid 79 for driving the pinch rollers 45 and 46 will be described. The explanation will be made in conjunction with FIGS. 5(*a*) through 5(*f*). In FIGS. 5(*a*) through 5(*d*), right views are top views while left views are views viewed immediately below the bottom plate 3. As shown in FIG. 5(*e*), the pinch rollers 45 and 46 are mounted on pinch roller mounting plates 47 and 48 which are pivoted with pins 49 and 50 to the bottom plate 3. 51 through 54 are guide slots formed in the bottom plate 3. The slots 51 and 52 are in the form of an L letter while the slots 53 and 54, in the form of an I letter, 55 and 56 are pins attached to the pinch roller mounting plates 47 and 48 and are extended through the guide slots 51 and 52 downwardly of the bottom plate 3. 57 and 58 are pins each having been its one end fastened to the chassis plate 37 and extending through the guide slots 53 and 54 and carrying rotatably pinch roller switching plates 59 and 60, respectively. 61 is a spring loaded between the pinch roller switching plates 59 and 60. 62 nd 63 are pins attached to a shaft plate 64 which is displaced between a first position indicated by the solid lines and a second position indicated by the broken lines in FIG. 5(f) whenever the solenoid 79 is energized. Either of the pinch roller 45 or 46 is selected by the pins 62 and 63 under the force of the spring 61. (In FIGS. 5(a) through 5(d), only pins are shown for the sake of simplicity in explanation.) The solenoid 79 is energized when a manual switch is closed or in response to the signal generated at the end of the tape transport in one direction. FIG. 5(a) shows the inoperative position (corresponding to that shown in FIG. 1), FIGS. 5(b) and 5(c), the operative position (corresponding to that shown in FIG. 2; FIG. 5(b) showing that the shift plate 64 is in the position indicated by the broken lines in FIG. 5(f), causing the pinch roller 46 to press against the capstan 34 and FIG. 5(c) showing that the shift plate 64 is in the position indicated by the solid lines in FIG. 5(f), causing the pinch roller 45 to press against the capstan 33) and FIG. 5(d) shows the fast-forward or rewind position.

Figures 5E, 5F:
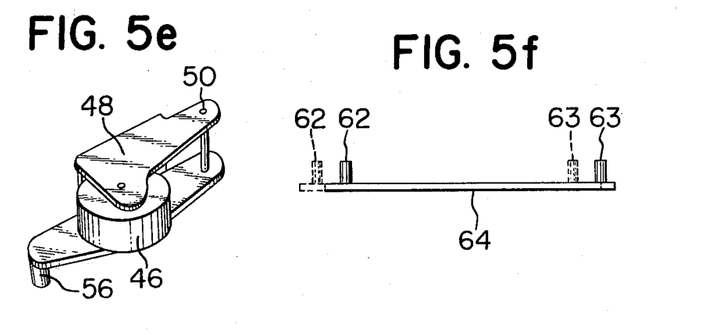

When the shift plate 64 is in the position indicated by the broken lines in FIG. 5(f) and the chassis plate 37 is displaced from the inoperative position shown in FIG. 1 to the operative position shown in FIG. 2, the pinch roller switching plate 59 engages with the pin 62 as shown in FIG. 5(b) to prevent the displacement of the pin 55 so that the pinch roller 45 is spaced apart from the capstan 33. The pinch roller switching plate 60 is disengaged from the pin 63 so that the force of the spring 61 causes the pinch roller 34 to press against the capstan 34. When the shift plate 64 is displaced toward the position indicated by the solid lines in FIG. 5(f), the condition is opposite to that shown in FIG. 5(b). That is, the pinch roller 45 is pressed against the capstan 33 as shown in FIG. 5(c).

Figure 6:
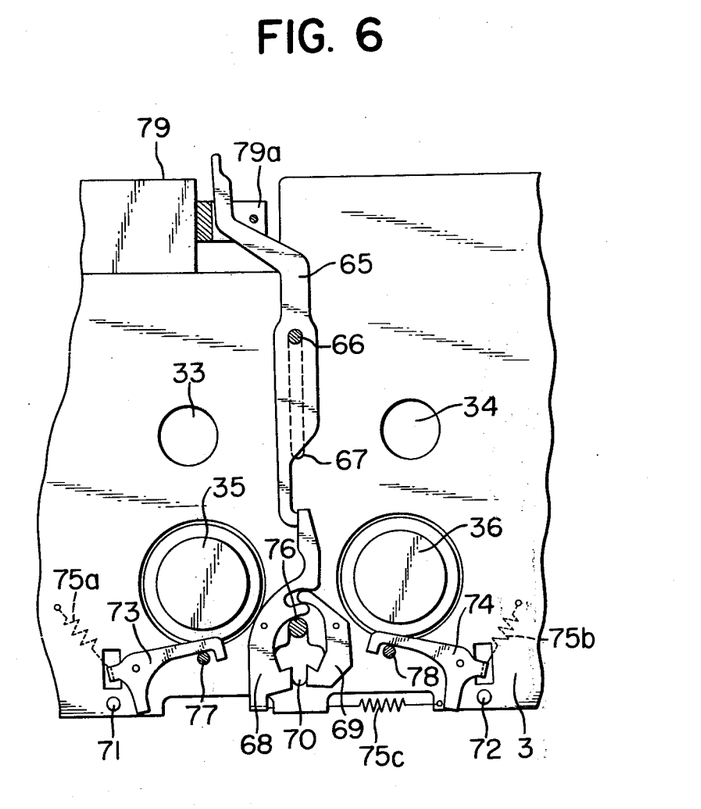
FIGS. 6 through 10 are views used for the explanation of the fast-forward and rewinding modes.
Figure 7:
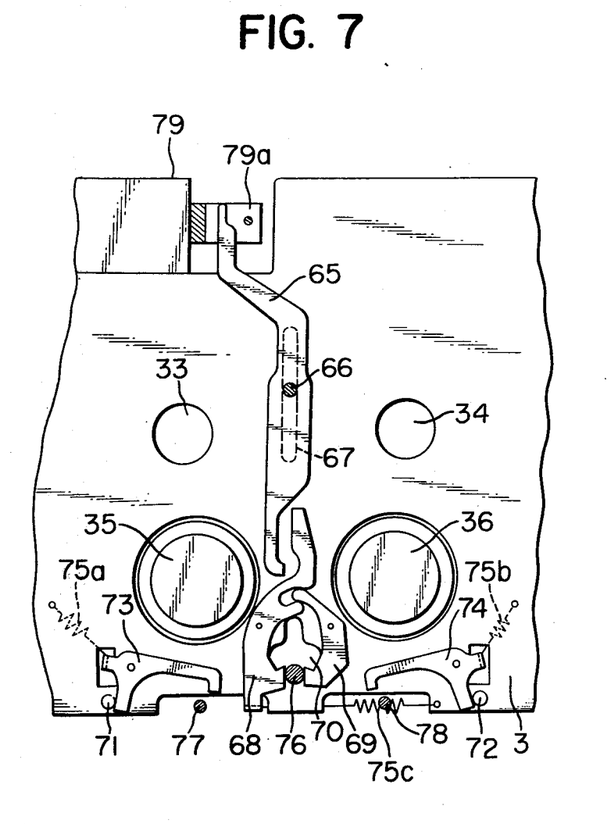
Figure 8:
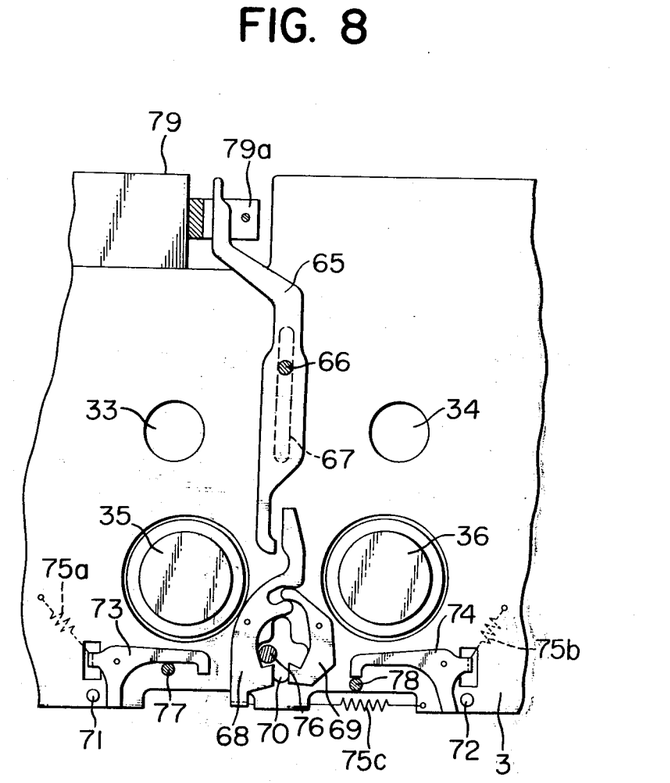
Figure 9:
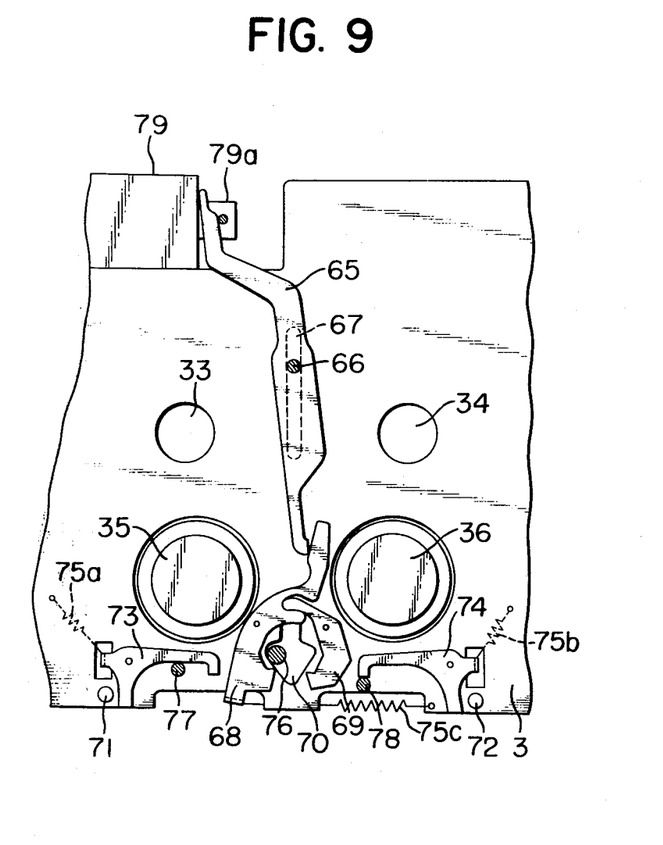

So far the relation between the pinch rollers 45 and 46 has been described. Next the relation between the fast-forward and rewind will be described with reference to FIGS. 6 through 9 in addition to FIG. 5(d). In FIGS. 6 through 9, 79a is a solenoid shaft; 65, a lever for releasing the fast-forward or rewind which has a pin 66 fitted into an elongated slot 67 formed in the bottom plate 3; and 68 and 69 are cams rotatably supported on the bottom plate. A cross-shaped guide slots 70 is formed in the bottom plate 3 between the cams 68 and 69. 71 and 72 are stoppers for locking arms 73 and 74 for preventing the tape break to which are fastened the springs 40 and 41 (See FIG. 1) and which are pivoted to the bottom plate 3. 75a and 75b are springs for biasing the locking arms 73 and 74 in one direction. 75c is a spring for biasing one end of the cam 68 in one direction. 76 through 78 are pins extended from the chassis plate 37 (not shown in FIG. 6 through FIG. 9). The pin 76 is fitted into the guide slot 70. The pins 77 and 78 are provided for locating the chassis plate 37. FIG. 6 shows the inoperative position; FIG. 7, the operative position; FIG. 8, the fast-forward position; FIG. 9 shows the solenoid 79 energized in the fast-forward mood; and FIG. 10 shows the operation of the locking arm 73 when the fast-forward mode is switched to the rewind mode.

In FIG. 2, the chassis plate 37 may be rotated in the directions indicated by the arrow B only when the tape recorder is in the operative position. When the knob 39 is rotated in one direction against the spring 40 or 41, the chassis plate 37 is rotated through an angle which depends upon the displacement of one of the projections 38 of the chassis plate 37 permitted in the corresponding guide slots 29 of the plate cam 25 or 26. The pin 76 of the chassis plate 37 pushes the plate cam 68 or 69 in one direction while displacing itself within the guide slot 70 and then is locked by the cam 68 or 69 under the force of the spring 76. FIG. 8 shows the pin 76 locked by the cam 68.

When the solenoid 79 is energized so that the solenoid shaft 79a is pulled, the release lever 65 is rotated about the pin 66 so that one end of the release lever 65 pushes the cam 68 to rotate it. Therefore, the pin 76 is released from the cam 68. In this case, even when the pin 76 has been locked by the cam 69, when the lever 65 is rotated about the pin 65 in the counterclockwise direction as shown in FIG. 9, the cam 68 is rotated in the clockwise direction while the cam 69 is rotated in the counterclockwise direction so that the pin 76 is released from the cam 69 and is returned to the initial position as shown in FIG. 7 in the guide slot 70 under the forces of the springs 40 and 41. In the fast-forward or rewind mode shown in FIG. 8, when the knob 39 is rotated in the opposite direction for rewinding or fast-forward, too rapid operation will break the tape because the tape transport is suddenly reversed.

Figure 10:
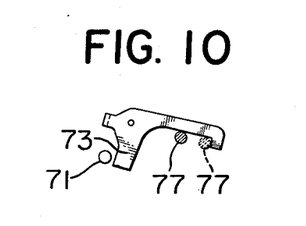

In order to prevent the tape break, when the pin 77 is displaced in unison with the chassis plate 37 to the position indicated by the broken lines in FIG. 10, it is locked in this position by the locking arm 73 so that no further displacement may be permitted. When the mode is switched to the operative mode as shown in FIG. 7 from the fast-forward or rewind mode, the pin 77 or 78 is located as shown in FIG. 7 so that the rewind or fast-forward mode may be selected.

So far the preferred embodiment of the present invention has been described. According to the present invention, the cassette holders 4 and 5 are positioned independently of each other for receiving the side walls of the tape cassette, and the movement of the cassette holders 4 and 5 is controlled by the plate cams 25 and 26. In addition, the plate upon which is mounted the magnetic head 20 is flat as indicated by 37. Therefore, the tape recorder may be made thin in size.

Figure 11:
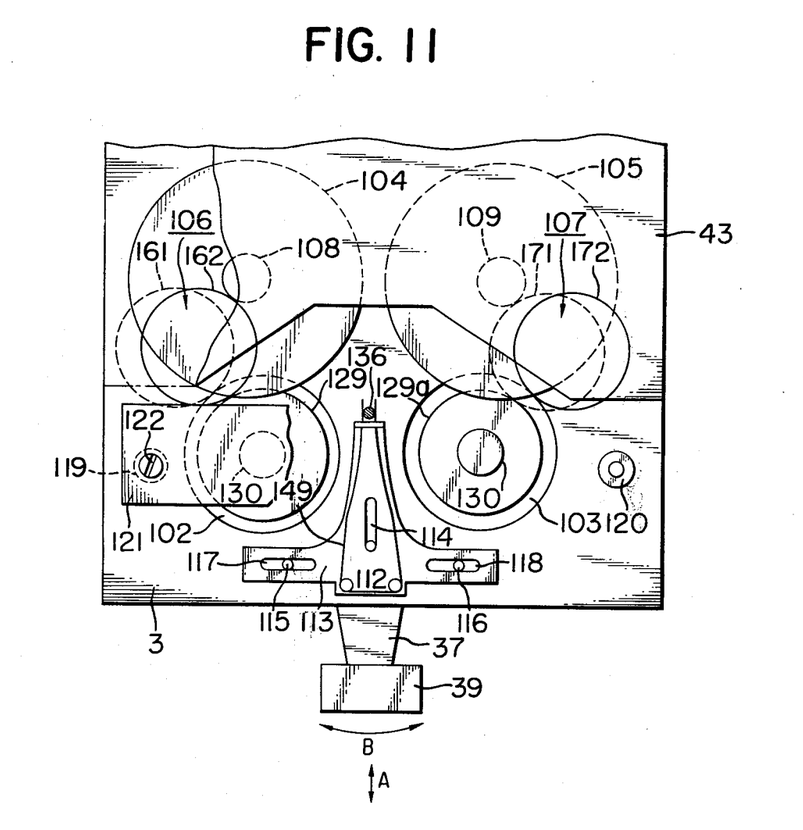
FIGS. 11 through 14 show the parts positioned underside of the bottom plate.
Figure 12:
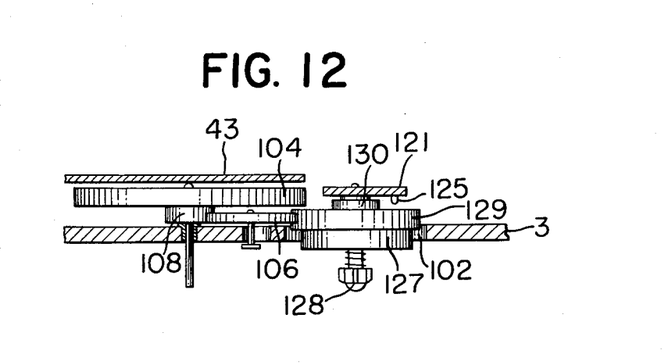
Figure 13:
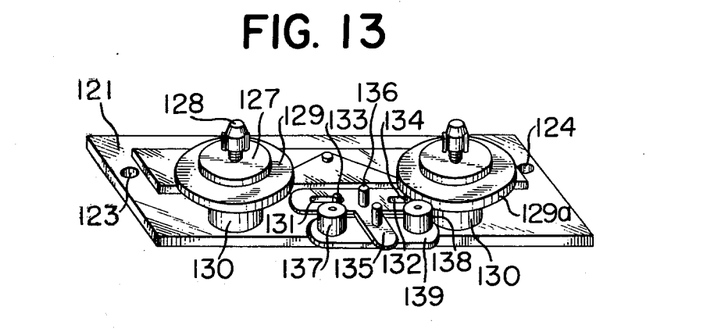
Figure 14:
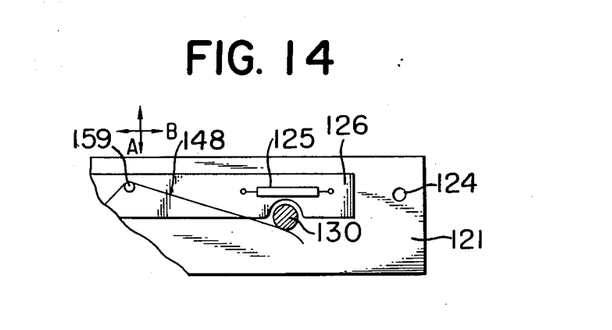

The chassis plate 37 is so arranged as to be pushed forwardly only in the operative position, and whether the tape recorder is in the operative position or not may be easily detected depending upon the position of the knob 39 attached to the chassis plate 37. In addition, before the tape recorder is set to the operative mode, the knob 39 may be retracted as to be almost coplanar with the front surface of the tape recorder so that the safeguarded operation may be ensured. Furthermore, the knob is extended out of the front surface of the recorder in the operative mode so that the ejection operation may be much facilitated. The plate cams 25 and 26 are operatively interconnected by the rod 31 so that the movement of the cassette holders 4 and 5 may be synchronized. When one operates the knob 39 to switch the fast-forward mode from the rewind mode or vice versa, the switching operation is carried out after the recorder has been set to the operative mode so that the damage to the tape in the cassette may be prevented. Magnets may be attached to the reel spindles 35 and 36 while reed switches may be positioned in the proximity of the reel spindles so that the rotating conditions of the reel spindles may be detected and accordingly in response to the output from the reed switch the end of the tape may be detected. However, the maintenance of the reed switches mounted on the chassis is not easy. Especially, when the reed switches are replaced, other parts tend to be adversely affected. FIGS. 11 through 14 are views used for the explanation of a tape end detecting mechanism which may overcome the above and other problems. FIG. 11 shows the arrangement of parts positioned at the bottom of the tape recorder or disk player, more specifically, on the underside of the bottom plate. In FIG. 11, 102 and 103 are holes formed in the bottom plate through which are inserted turntables. 104 and 105 are flywheels, and 106 and 107 are idlers. In the operative mode, the idler 106 is pressed against a flywheel shaft 108 as indicated by the solid line circle while the idler 107 is moved away from a flywheel shaft 109 as shown by the solid line circle. On the other hand, when the idler 107 is pressed against the shaft 109 as indicated by the broken line circle while the idlder 161 is moved away from the shaft 108 as indicated by the broken-line circle. In the fast-forward or rewind mode, both the idlers 106 and 107 are moved away from the shafts 108 and 109 as indicated by the circles 161 and 172. The arrangement of the idlers and the flywheels described above is substantially similar to that of the conventional tape recorders; so that no further detailed explanation shall be given in this specification 43 is the plate upon which are mounted the flywheels. 113 is a switching plate having a release slot 114 into which is fitted a pin 112 extended from the chassis plate 37 and guide slots 117 and 118 into which are fitted pins 115 and 116, respectively, of the bottom plate 3, and 149 is a switching spring. During the displacement in either direction indicated by the arrow A of the chassis plate 37, the switching plate 113 remains stationary, but when the chassis plate 37 is displaced in the right or left direction indicated by the arrow B, the pin 112 pushes the side wall of the release slot 114 so that the switching plate 113 is displaced by a distance which is dependent upon the length of the guide slot 117 and 118. 119 and 120 are fastening means each having its one end securely fastened to the bottom plate 3; 121 is a reel spindle supporting plate having screw holes 123 and 124 through which are inserted screws 122 screwed into the fastening means 119 and 120. A printed circuit board 126, upon which are mounted reed switches 125, is mounted upon the reel spindle supporting plate 121. 127 is a turntables; 128 is an engaging end of the reel spindles for engagement with the corresponding hole of the reels in the cassette; and 129 is a roller formed integral with the turntable 127 and for engagement with the idler 106 or 107. 130 is a magnets carried by the spindle shaft (not shown) for rotation in unison with the turntable 127 and the roller 129. 129a is another roller corresponding to the roller 129. 131 and 132 are guide slots formed in a shift plate 135, 133 and 134 are pins fitted on the reel spindle supporting plate 121 and extended through the guide slots 131 and 132, and 136 is a pin fitted on the shift plate 135 and engaged with the switching spring 149. A roller mounting plate 139 upon which are rotatably mounted rollers 137 and 138 is rotatably attached to the shift plate 135. 148 is a brake spring the midpoint of which is engaged with a pin 159 extended from the reel spindle supporting plate 121 and both ends of which are made into engagement with the magnet 130 and a rotary member.

When the spindle supporting plate 121 is mounted on the bottom plate as shown in FIG. 11, the rollers 129 and 129a are placed in the holes 102 and 103 formed through the bottom plate 3. In the state shown in FIG. 11, the idler 106 or 107 engages with the flywheel shaft 108 or 109 and with the roller 129 or 129a so that one of the spindles is rotated in unison with the flywheel 104 or 105. In this case, the rollers 137 and 138 are moved away from the flywheels 104 and 105 and the rollers 129 and 129a.

When the chassis plate 37 is displaced to the right as indicated by the arrow B, the switching plate 113 is displaced in the same direction and the shift plate 135 is also displaced in the same direction through the switching spring 149 and the pin 136. As a result, one of the rollers 137 and 138 (in this case 138) which are rotatably mounted on the shift plate 135 is displaced into engagement with the flywheel 105 and the roller 129a so that the rotation is transmitted from the flywheel 105 through the roller 138 instead of the idler 106 or 107 to the roller 129a. When the chassis plate 37 is displaced in the left direction as indicated by the arrow B, the roller 137 couples the flywheel 104 to the roller 129.

The reed switches 125 are positioned in the proximity of the roller 129 and 129a and are mounted on the printed circuit board 126 for the rotation of the rollers 129 and 129a, thereby the rotating conditions of the rollers 129 and 129a may be detected. The brake spring may apply the retarding forces to both the spindles which are paired. Two rollers 137 and 138 are provided and mounted on the mounting plate 139 which is rotatable relative to the shift plate 135 so that the positive engagement with the flywheels and the rollers carried by the spindles may be ensured. To replace the reed switches 125, first the screws 122 are unscrewed, and then the spindle supporting plate 121 is removed from the bottom plate so that the maintenance can be easily carried out.

What is claimed is:

1. A cassette recorder having cassette insertion, record/play-back, fast-forward, rewind, and eject modes of operation, said recorder comprising:

a bottom plate having forward and rearward portions and side plates substantially perpendicular to said bottom plate on each side thereof;

a chassis plate parallel to said bottom plate and movable over said bottom plate in forward and rearward directions, said chassis plate being rotatable with respect to said bottom plate in sliding contact therewith, said chassis plate also having holes therein through which driving capstans and reel spindles may extend, and a knob affixed to the forward portion thereof for selectively initiating said fast-forward, rewind and ejection modes of operation, said chassis plate further having lateral projections extending toward each of said side plates;

a magnetic head mounted on said chassis plate adjacent the rearward portion thereof;

a pair of cassette holding elements disposed between said side plates and movable toward and away from said bottom plate in a direction perpendicular thereto;

first and second plate cams adjacent and parallel to respective ones of said side plates, said cams being coupled for synchronized rotation about an axis perpendicular to said side plates;

means for coupling each of said plate cams to an adjacent one of said cassette holding elements, so that rotation of said cams results in movement of said elements toward and away from said bottom plate in said given direction;

first and second arms arranged in the form of an X, one end of each of said arms being pivotally mounted to said bottom plate adjacent the rearward portion thereof, the free end of each of said arms comprising a cassette detecting projection, the ends of said arms pivoted to said bottom plate having stopping members for engaging said plate cams to lock said cams in a predetermined rotational position when said projections are relatively remote from the rearward portion of said bottom plate, and for releasing said plate cams from said locked stated when said projections are adjacent said rearward portion of said bottom plate, spring means for rotating said arms with respect to said bottom plate to move said projections away from the rearward portion thereof, said projections being pushed toward said rearward portion by a cassette inserted between said holding elements;

spring means for urging said chassis plate toward the forward portion of said bottom plate to cause the projections of said chassis plate to engage said plate cams to rotate said cams to cause said cassette holding elements to move toward said bottom plate when said cams are unlocked by movement of said arm projections toward the rearward portion of said bottom plate, said recorder being simultaneously placed in the record/play-back mode;

means responsive to the movement of said knob toward said bottom plate to place said recorder in the eject mode, said movement of said knob resulting in corresponding movement of said chassis plate and rotation of said cams, said rotation of said cams resulting in (i) movement of said lateral projections and said chassis plate a predetermined distance toward the forward portion of said bottom plate and (ii) movement of said cassette holding elements away from said bottom plate in said given direction, whereby any cassette disposed between said holding elements is ejected;

means responsive to rotation of said knob and chassis plate in one direction for limiting the angle of such rotation by engagement between said lateral projections and said cams and for placing said recorder in a selected one of said fast-forward and rewind modes; and means responsive to rotation of said knob and chassis plate in the other direction for limiting the angle of rotation in said other direction by engagement of said lateral projections with said cams, and for simultaneously placing said recorder in the other of said fast-forward and rewind modes.

2. A cassette tape recorder as set forth in claim 1 further comprising means for locking said chassis plate in position when said chassis plate is rotated in one direction relative to said bottom plate and for releasing said chassis plate when the end of the tape within a cassette is reached, and in response to a control signal.

3. A cassette tape recorder as set forth in claim 1 further comprising means for locking said chassis plate in position when said chassis plate is rotated in one direction relative to said bottom plate and for releasing said chassis plate when the end of the tape within a cassette is reached, and in response to a control signal, and means for preventing the rotation of said chassis plate in the opposite direction unless said chassis plate is returned once to a central position.

4. A cassette tape recorder as set forth in claim 1 further comprising means movable in unison with said chassis plate for locating two pinch rollers corresponding to two capstans, and means for effecting the switching of the pressing contact of the pinch rollers against the capstan in the record/play-back mode.

5. A cassette tape recorder as set forth in claim 1 further comprising means interposed between said plate cams for providing synchronized movement thereof.

6. A cassette recorder according to claim 1, wherein said magnetic head is disposed under said arms when said recorder is in the record/play-back mode with a cassette disposed between said holding elements, each of said arms having holes therein adjacent said heat for permitting adjusting screws to be inserted through said holes to adjust the angle of the head.

7. A cassette recorder according to claim 1, further comprising a pair of reel spindles mounted on a reel spindle supporting plate affixed to said bottom plate, and a reed switch for detecting rotation of said reel spindles disposed on said reel spindle supporting plate adjacent said spindles.

8. A cassette recorder according to claim 7, further comprising a brake spring mounted on said reel spring supporting plate with the ends of said spring engaging respective ones of said spindles.

* * * * *

UNITED STATES PATENT OFFICE
CERTIFICATE OF CORRECTION

Patent No. 4,071,860          Dated January 31, 1978

Inventor(s) Kaoru Watanabe, et al

It is certified that error appears in the above-identified patent and that said Letters Patent are hereby corrected as shown below:

Column 1, line 31: "cassete" should be --cassette--.

line 54: After "inspection" insert a comma.

Column 3, line 30: "rotated" should be --rotate--.

Column 5, line 7: "nd" should be --and--.

Column 7, line 22: "idlder" should be --idler--.

line 31: After "specification" insert a period.

Column 10, line 37: "heat" should be --head--.

Signed and Sealed this

Eleventh Day of July 1978

[SEAL]

Attest:

RUTH C. MASON
Attesting Officer

DONALD W. BANNER
Commissioner of Patents and Trademarks